(12) United States Patent
Hirosawa et al.

(10) Patent No.: US 9,939,849 B2
(45) Date of Patent: Apr. 10, 2018

(54) SYSTEM WITH ELECTRONIC DEVICE AND EXTENSION DEVICE

(71) Applicant: KABUSHIKI KAISHA TOSHIBA, Minato-ku, Tokyo (JP)

(72) Inventors: Hideki Hirosawa, Gumma (JP); Yutaka Horie, Tokyo (JP); Akio Kanou, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 309 days.

(21) Appl. No.: 14/820,062

(22) Filed: Aug. 6, 2015

(65) Prior Publication Data

US 2016/0126757 A1    May 5, 2016

Related U.S. Application Data

(60) Provisional application No. 62/072,732, filed on Oct. 30, 2014.

(51) Int. Cl.

| | |
|---|---|
| *G06F 1/16* | (2006.01) |
| *H02J 7/00* | (2006.01) |
| *G06F 1/26* | (2006.01) |
| *G06F 3/02* | (2006.01) |
| *G06F 3/023* | (2006.01) |

(52) U.S. Cl.
CPC .......... *G06F 1/1669* (2013.01); *G06F 1/1632* (2013.01); *G06F 1/1635* (2013.01); *G06F 1/263* (2013.01); *G06F 1/266* (2013.01); *G06F 3/0202* (2013.01); *G06F 3/0231* (2013.01); *H02J 7/0054* (2013.01); *H02J 2007/0096* (2013.01)

(58) Field of Classification Search
None
See application file for complete search history.

(56) References Cited

U.S. PATENT DOCUMENTS

| 8,248,031 B2 | 8/2012 | Yamasaki et al. | |
|---|---|---|---|
| 2007/0120525 A1 | 5/2007 | Tsuji | |
| 2007/0247114 A1* | 10/2007 | Makwana | G06F 1/1632 320/116 |
| 2010/0039764 A1* | 2/2010 | Locker | G06F 1/1615 361/679.29 |

(Continued)

FOREIGN PATENT DOCUMENTS

| JP | 10-198468 A | 7/1998 |
|---|---|---|
| JP | 2007-149009 A | 6/2007 |

(Continued)

*Primary Examiner* — Jared Fureman
*Assistant Examiner* — Aqeel Bukhari
(74) *Attorney, Agent, or Firm* — Foley & Lardner LLP

(57) ABSTRACT

According to one embodiment, a system includes an electronic device and an extension device. The electronic device includes a first connector to which a first AC adapter is connected, a first control IC including a first power supply controller, and a first charger IC to charge a first battery with power from the first AC adapter in response to an instruction from the first power supply controller. The extension device includes a second connector to which a second AC adapter is connected, a second control IC including a second power supply controller, and a second charger IC to charge a second battery with power from the second AC adapter in response to an instruction from the second power supply controller.

6 Claims, 15 Drawing Sheets

(56) References Cited

U.S. PATENT DOCUMENTS

| | | | |
|---|---|---|---|
| 2011/0101913 A1 | 5/2011 | Matsumoto et al. | |
| 2014/0152261 A1* | 6/2014 | Yamauchi | B60L 11/1866 320/118 |
| 2016/0077549 A1* | 3/2016 | Wang | G06F 1/1632 710/304 |

FOREIGN PATENT DOCUMENTS

| | | |
|---|---|---|
| JP | 2009-301281 A | 5/2011 |
| JP | 2011-101458 A | 5/2011 |

* cited by examiner

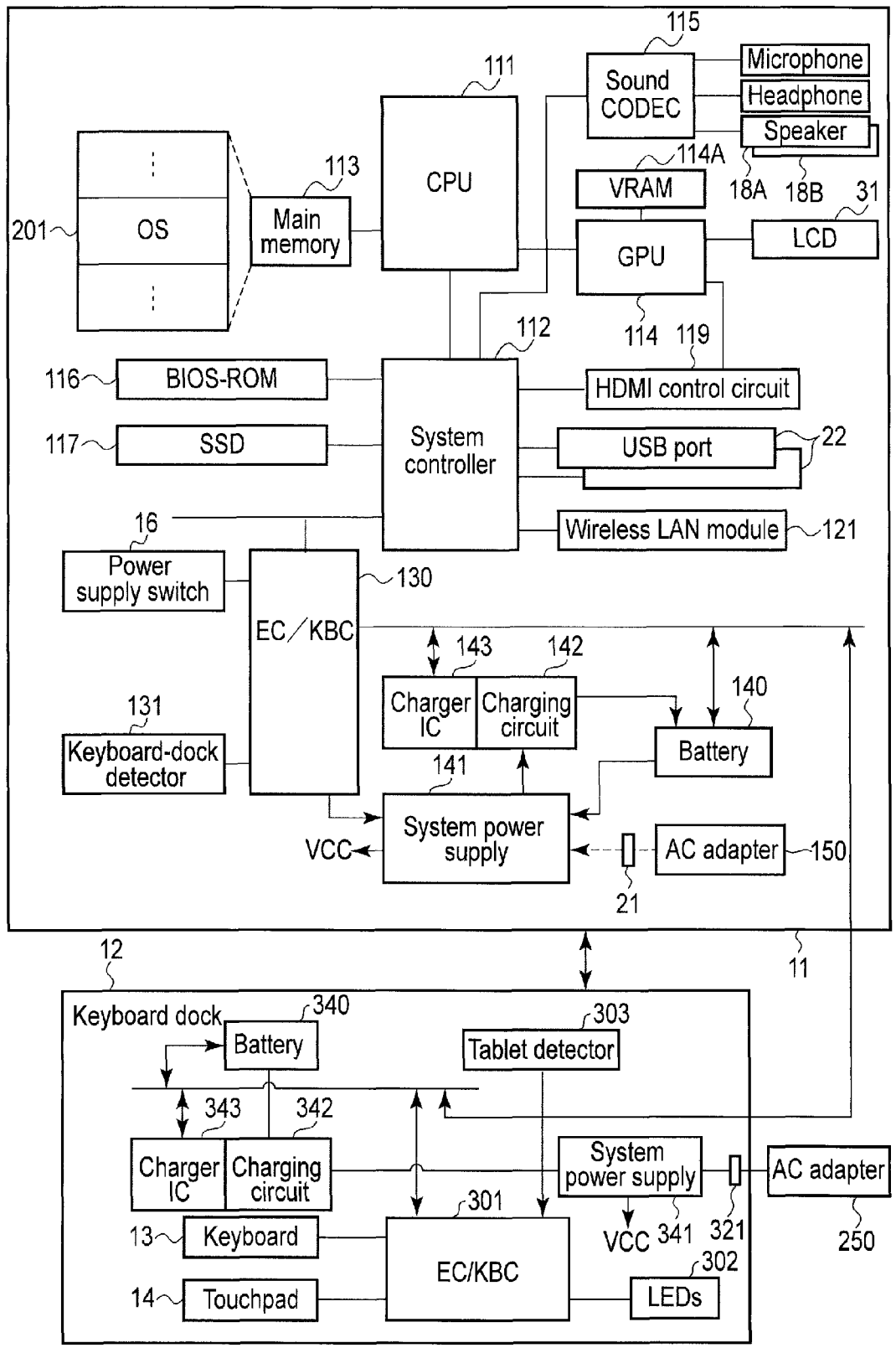
F I G. 2

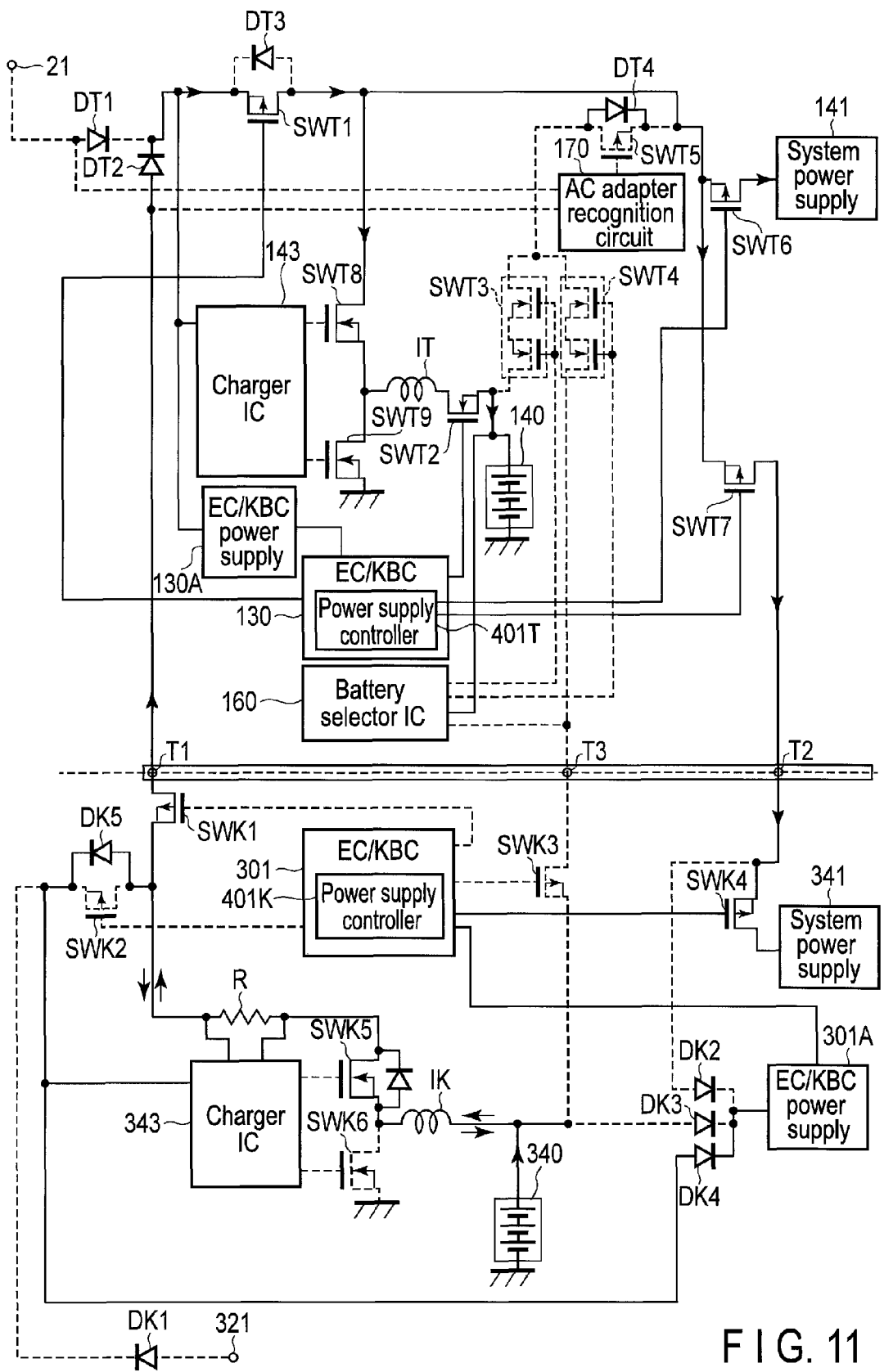
F I G. 11

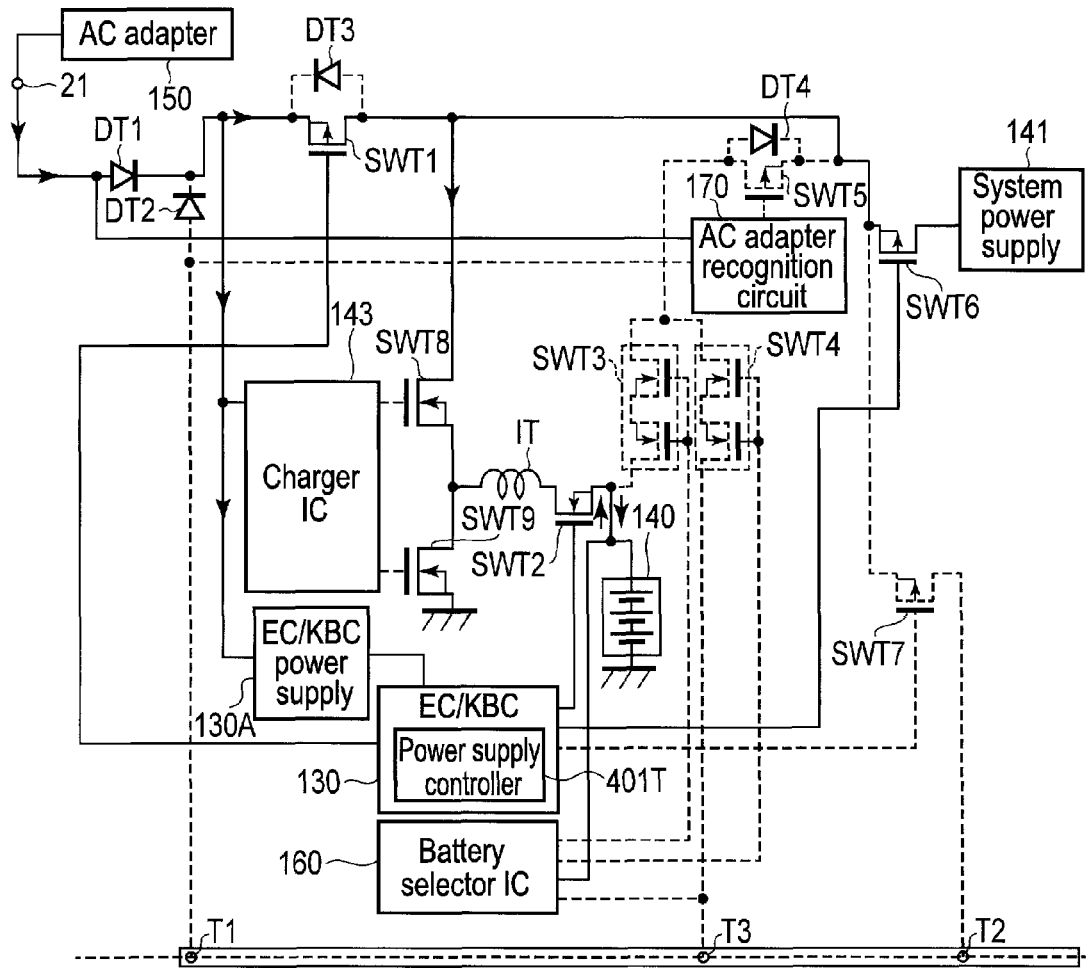
F I G. 12

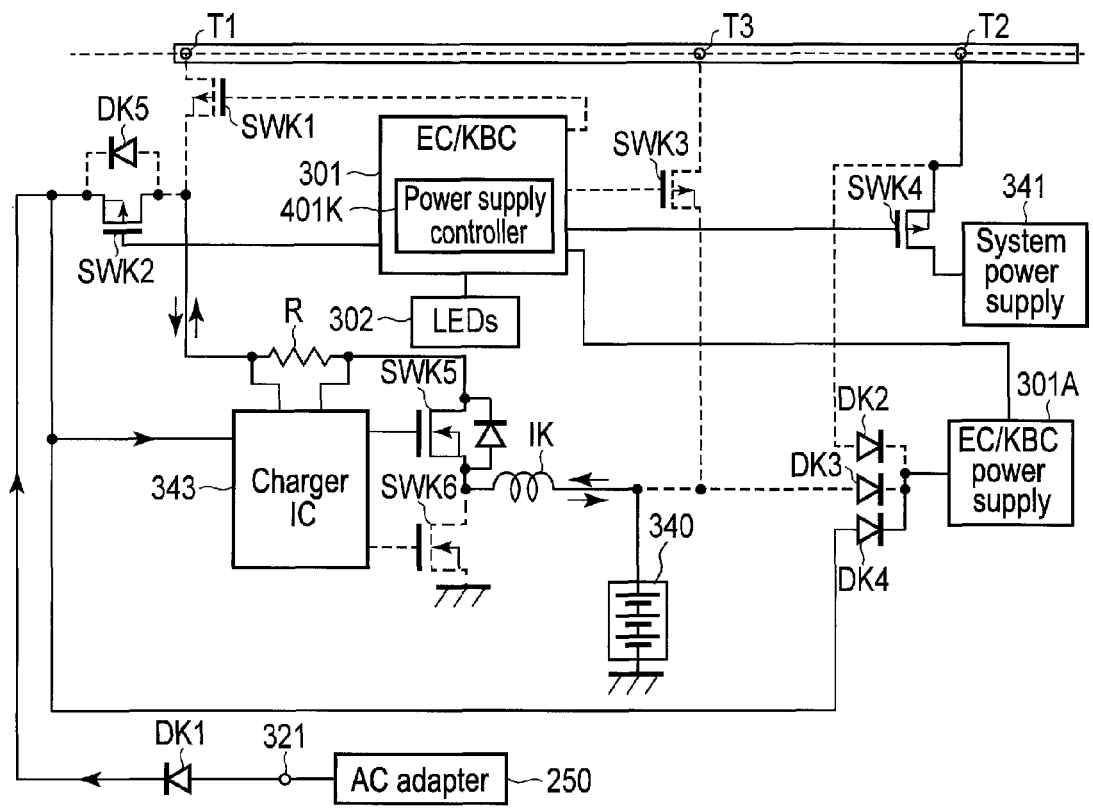
F I G. 14

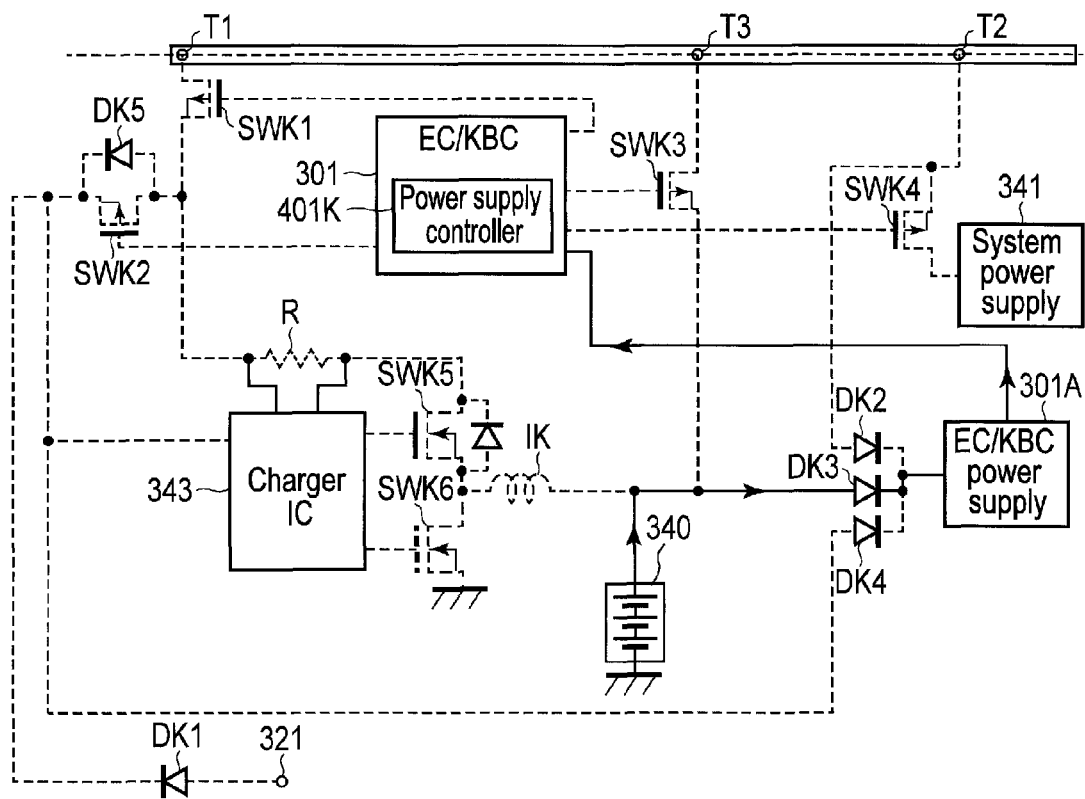
F I G. 15

SYSTEM WITH ELECTRONIC DEVICE AND EXTENSION DEVICE

CROSS-REFERENCE TO RELATED APPLICATIONS

This application claims the benefit of U.S. Provisional Application No. 62/072,732, filed Oct. 30, 2014, the entire contents of which are incorporated herein by reference.

FIELD

Embodiments described herein relate generally to a system in which an electronic apparatus and an extension apparatus are each provided with a battery.

BACKGROUND

In recent years, 2-in-1 PCs which can be used in the two forms of a notebook personal computer (PC) and a tablet have been sold. The 2-in-1 PCs include a detachable 2-in-1 PC in which a housing comprising a display is attachable to and detachable from a housing comprising a keyboard.

In some detachable 2-in-1 PCs, a housing comprising a display and a housing comprising a keyboard are each provided with a battery. In such a housing comprising a keyboard of a detachable 2-in-1 PC, a plurality of switches included in a power supply path cannot be easily controlled.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing a configuration of the system according to the embodiment.

FIG. 11 is an illustration showing the case of operating on DC power obtained by stepping up the voltage of DC power from the battery of the keyboard dock.

FIG. 12 is an illustration showing the case where the tablet operates on DC power from the AC adapter in the state of not being mounted on the keyboard dock.

FIG. 14 is an illustration showing the case where the keyboard dock 12 operates alone on DC power from the AC adapter.

FIG. 15 is an illustration showing the case where the keyboard dock 12 operates alone on DC power from the battery.

DETAILED DESCRIPTION

In general, according to one embodiment, a system includes an electronic device and an extension device which the electronic device is detachable from and attachable to. The electronic device comprises a first battery, a first connector to which a first AC adapter is connected, a first control IC comprising a first power supply controller, and a first charger IC configured to charge the first battery with power supplied from the first AC adapter in response to an instruction from the first power supply controller. The extension device comprises a second battery, a second connector to which a second AC adapter is connected, a second control IC comprising a second power supply controller, and a second charger IC configured to charge the second battery with power supplied from the second AC adapter in response to an instruction from the second power supply controller.

Various embodiments will be described hereinafter with reference to the accompanying drawings.

Figure 1:
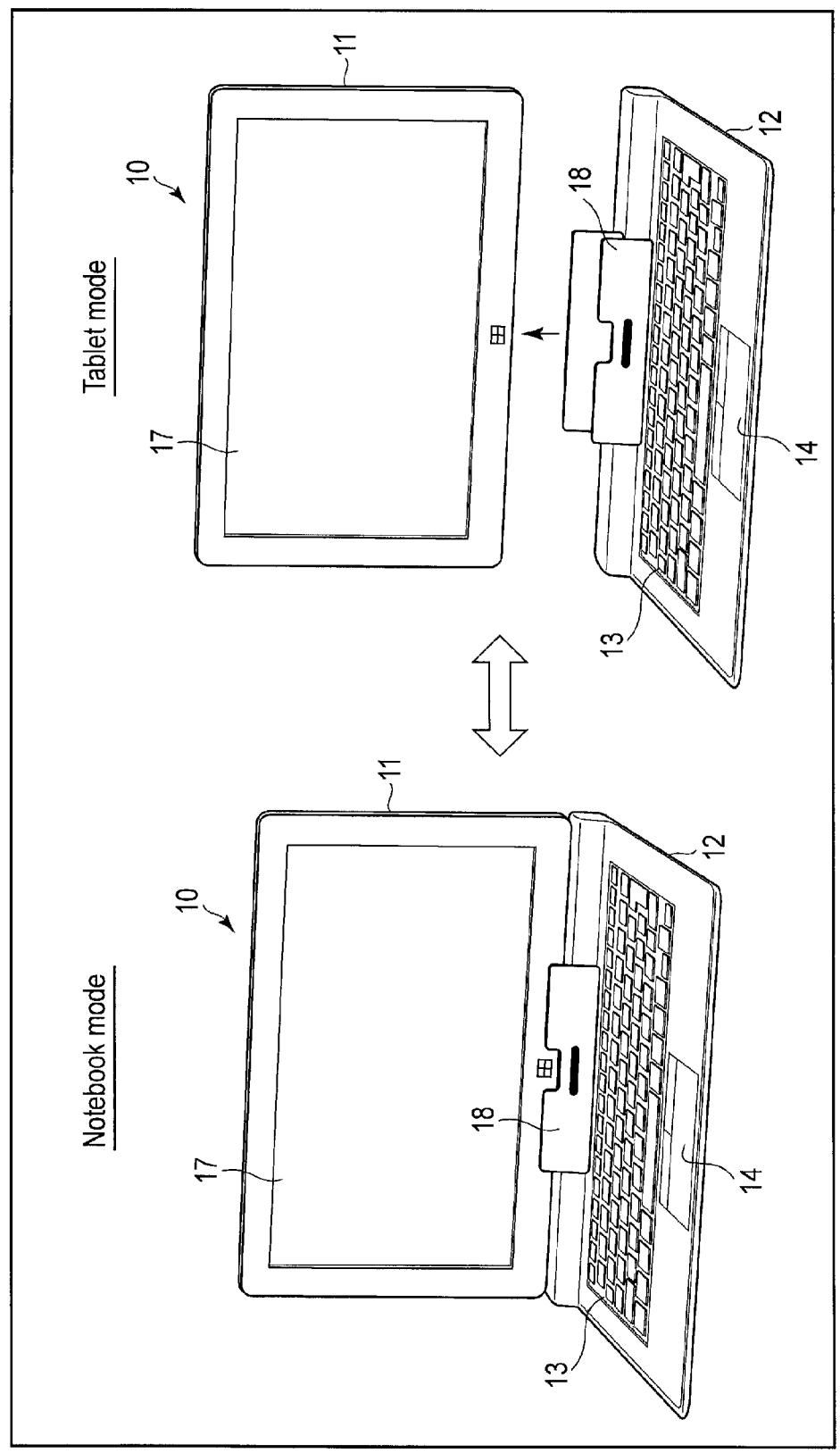
FIG. 1 is an exemplary perspective view showing an outside of a system according to an embodiment.

FIG. 1 is an illustration showing an outside corresponding to each of a notebook mode and a tablet mode of an electronic device according to one embodiment. The electronic device is implemented as, for example, a 2-in-1 personal computer (PC) system 10. The 2-in-1 PC system 10 is used in a style corresponding to the notebook mode shown in the left part of FIG. 1 or the tablet mode shown in the right part of FIG. 1.

The 2-in-1 PC system 10 comprises a keyboard dock 12 and a tablet 11. The keyboard dock 12 comprises a thin rectangular housing accommodating a keyboard, a battery, etc. On a top surface of the keyboard dock 12, a keyboard 13 and a touchpad 14 which is a pointing device are disposed. The touchpad 14 is disposed in a palm rest area on the top surface of the keyboard dock 12.

On a back side of the keyboard dock 12, a hinge 18 is provided. The tablet 11 is detachable from and attachable to the hinge 18 (the keyboard dock 12). In the tablet mode, the tablet 11 is detached from the keyboard dock 12 while being used.

On a front surface of the tablet 11, that is, a display surface of the tablet 11, a display 17 is disposed. The display 17 is implemented as a touchscreen display which can detect a position of a pen or a finger on a screen of the display 17.

In the notebook mode, the 2-in-1 PC system 10 is used mainly in the state of being placed on a horizontal plane, for example, a desk. A user operates mainly the keyboard 13 as in a normal notebook computer.

On the other hand, in the tablet mode, the tablet 11 is used mainly in the state of being held by one hand or both hands of the user. The user, for example, holds the 2-in-1 PC system 10 in one hand, and performs a touch operation on the display 17 by the other hand.

FIG. 2 shows a system configuration of the 2-in-1 PC system 10 in the embodiment. The tablet 11 of the 2-in-1 PC system 10 comprises a CPU 111, a system controller 112, a main memory 113, a graphics processing unit (GPU) 114, a sound CODEC 115, a BIOS-ROM 116, a solid-state drive (SSD) 117, a wireless LAN module 121, an embedded controller/keyboard controller IC (EC/KBC) 130, a keyboard-dock detector 131, a charging circuit 142, a charger IC 143, etc.

The CPU 111 is a processor which controls operation of each component of the 2-in-1 PC system 10. The CPU 111 executes various programs loaded from the HDD 117 to the main memory 113. The programs include an operating system (OS) and various application programs.

In addition, the CPU 111 also executes a Basic Input/Output System (BIOS) stored in the BIOS-ROM 116, which is a nonvolatile memory. The BIOS is a system program for hardware control.

The GPU 114 is a display controller which controls the LCD 17 used as a display monitor of the 2-in-1 PC system 10. The GPU 114 generates a display signal (LVDS signal) to be supplied to the LCD 17 from display data stored in a video memory (VRAM) 114A. Moreover, the GPU 114 can also generate an HDMI video signal from display data. An HDMI control circuit 119 is an interface for sending an HDMI video signal and a digital audio signal to an external display through, for example, an HDMI output terminal provided at the keyboard dock 12.

The system controller 112 is a bridge device which connects the CPU 111 and each component. The system controller 112 contains a serial ATA controller for controlling the solid-state drive (SSD) 117.

Further, to the system controller 112, devices such as a USB port 22 and the wireless LAN module 121 are connected.

Moreover, the system controller 112 communicates with each device connected through a bus.

The EC/KBC 130 is connected to the system controller 112 through a bus. In addition, the EC/KBC 130, and the charger IC 143 and a battery 140, are connected to each other through a serial bus.

The EC/KBC 130 is a power management controller for performing power management of the tablet 11, and is implemented as, for example, a single-chip microcomputer containing a keyboard controller which controls a keyboard (KB), a touchpad, etc. The EC/KBC 130 has a function of powering on or powering off the 2-in-1 PC system 10 in response to the user's operation of a power supply switch 16. The control of powering on or powering off the 2-in-1 PC system 10 is executed over a system power supply 141 by the EC/KBC 130.

The keyboard-dock detector 131 detects whether the tablet 11 is mounted on the keyboard dock 12. The keyboard-dock detector 131 notifies the EC/KBC 130 of a detection result.

The charger IC 143 is an IC which controls the charging circuit 142 under the control of the EC/KBC 130. The EC/KBC 130, the charger IC 143, and the system power supply 141 operate on power from the battery 140 or an AC adapter 150 connected to a power supply port 21 even when the 2-in-1 PC system 10 is powered off.

The system power supply 141 generates power (operation power) to be supplied to each component with any of power from the battery 140, power from the AC adapter 150 connected to the tablet 11 as an external power supply, and power from a dock. In addition, the system power supply 141 supplies power with which the battery 140 is charged by the charging circuit 142.

The charging circuit 142 charges the battery 140 with power supplied through the system power supply 141 under the control of the charger IC 143.

The keyboard dock 12 comprises the keyboard 13, the touchpad 14, an EC/KBC 301, LEDs 302, a tablet detector 303, a battery 340, a system power supply 341, a charging circuit 342, a charger IC 343, etc.

The EC/KBC 301 is a power management controller for performing power management of the keyboard dock 12, and is implemented as, for example, a single-chip microcomputer containing a keyboard controller which controls the keyboard (KB) 13, the touchpad 14, etc.

The tablet detector 303 detects whether the tablet 11 is mounted on the keyboard dock 12. The keyboard-dock detector 131 notifies the EC/KBC 130 of a detection result.

The charger IC 343 is an IC which controls the charging circuit 342 under the control of the EC/KBC 301.

The system power supply 341 generates power (operation power) to be supplied to each component and the 2-in-1 PC system 10 with power from the battery 340 or power supplied from an AC adapter 250 connected as an external power supply through a power supply port 321. In addition, the system power supply 341 supplies power with which the battery 340 is charged by the charging circuit 342.

The charging circuit 342 charges the battery 340 with DC power under the control of the charger IC 343.

The EC/KBC 301 controls a lighting state of the LEDs 302 depending on a remaining capacity of the battery 340.

Figure 3:
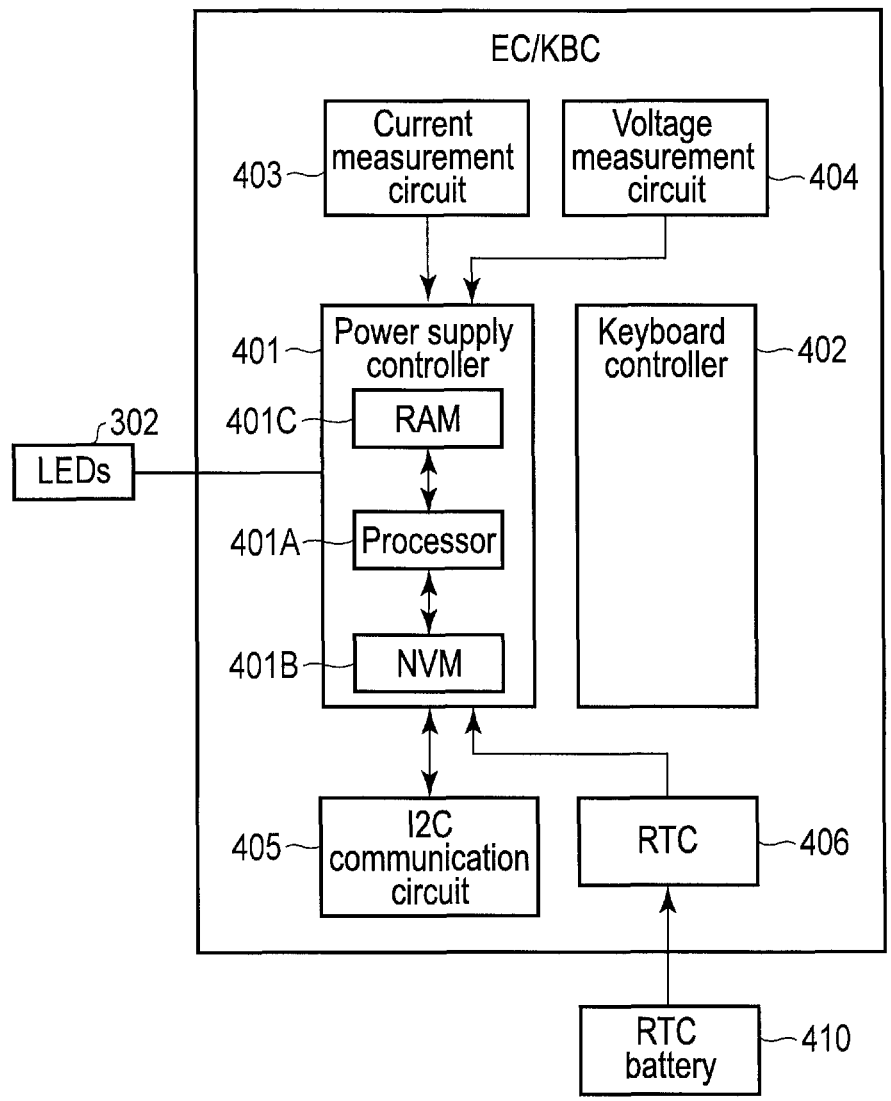
FIG. 3 is an exemplary functional block diagram showing a configuration of an EC/KBC according to the embodiment.

FIG. 3 is a block diagram showing a configuration of the EC/KBCs 130 and 301. The configuration of the EC/KBCs 130 and 301 will be described with reference to FIG. 3.

The EC/KBCs 130 and 301 each comprise a power supply controller 401, a keyboard controller 402, a current measurement circuit 403, a voltage measurement circuit 404, an $I^2C$ communication circuit 405, a real time clock (RTC) 406, etc.

The current measurement circuit 403 is a circuit for measuring a current value of power supplied to a battery. The voltage measurement circuit 404 is a circuit for measuring a voltage value of power supplied to a battery.

The power supply controller 401 comprises a processor 401A, a nonvolatile memory (NVM) 401B, a RAM 401C, etc. The processor executes a program loaded from the nonvolatile memory 401B to the RAM 401C. The processor 401A operates as the power supply controller 401 by executing the program.

A program stored in the nonvolatile memory 401B on the tablet 11 side and a program stored in the nonvolatile memory 401B on the keyboard dock 12 side are different programs.

The power supply controller 401 on the keyboard dock 12 side controls lighting of the LEDs 302 depending on a remaining capacity of the battery.

The keyboard controller 402 notifies the CPU 111 of a code corresponding to an operated key on the keyboard.

The $I^2C$ communication circuit is a circuit for communication between the EC/KBCs 130 and 301 and communication with a battery.

The RTC 406 is a circuit for measuring the time and date. To the RTC 406, an RTC battery 410 is connected. The RTC 406 is driven by power supplied from the RTC battery 410. The EC/KBCs 130 and 301 can be driven even if the remaining capacities of the batteries are zero.

If the tablet 11 is mounted on the keyboard dock 12, a supply source from which DC power is supplied to the system is determined by the power supply controller 401 on the tablet 11 side. Depending on a determination result, the power supply controller 401 on the tablet 11 side notifies the power supply controller 401 on the keyboard dock 12 side of a supply source of DC power, or requests it to supply DC power.

A key code corresponding to an operated key on the keyboard 13 on the keyboard dock 12 side is notified to the tablet 11 by I²C communication through the power supply controller 401 on the keyboard dock 12 side, whereby the number of pins of a connector between the tablet 11 and the keyboard dock 12 can be reduced.

In addition, the power supply controller 401 on the keyboard dock 12 side ensures security by not setting switches SWK1 to SWK4 in a conducting state when not determining that they are in a normal state. Further, when an abnormality is detected, the power supply controller 401 on the keyboard dock 12 side sets the switches SWK 1 to SWK4 in a non-conducting state.

Moreover, since the power supply controller 401 on the keyboard dock 12 side is provided, the keyboard dock 12 can alone control charge/discharge of a battery and estimate the life of a battery minutely.

Furthermore, the power supply controller 401 on the keyboard dock 12 side can notify the user of a charge/discharge state of a battery and a warning (telling that a battery is running out or has been removed, or the life of the battery) by controlling a lighting state of the LEDs 302.

In addition, the power supply controller 401 on the keyboard dock 12 side can reduce power consumption by setting the switch SWK4 which controls DC power supplied to the system power supply 341 in a non-conducting state if the keyboard dock 12 is alone.

Figure 4:
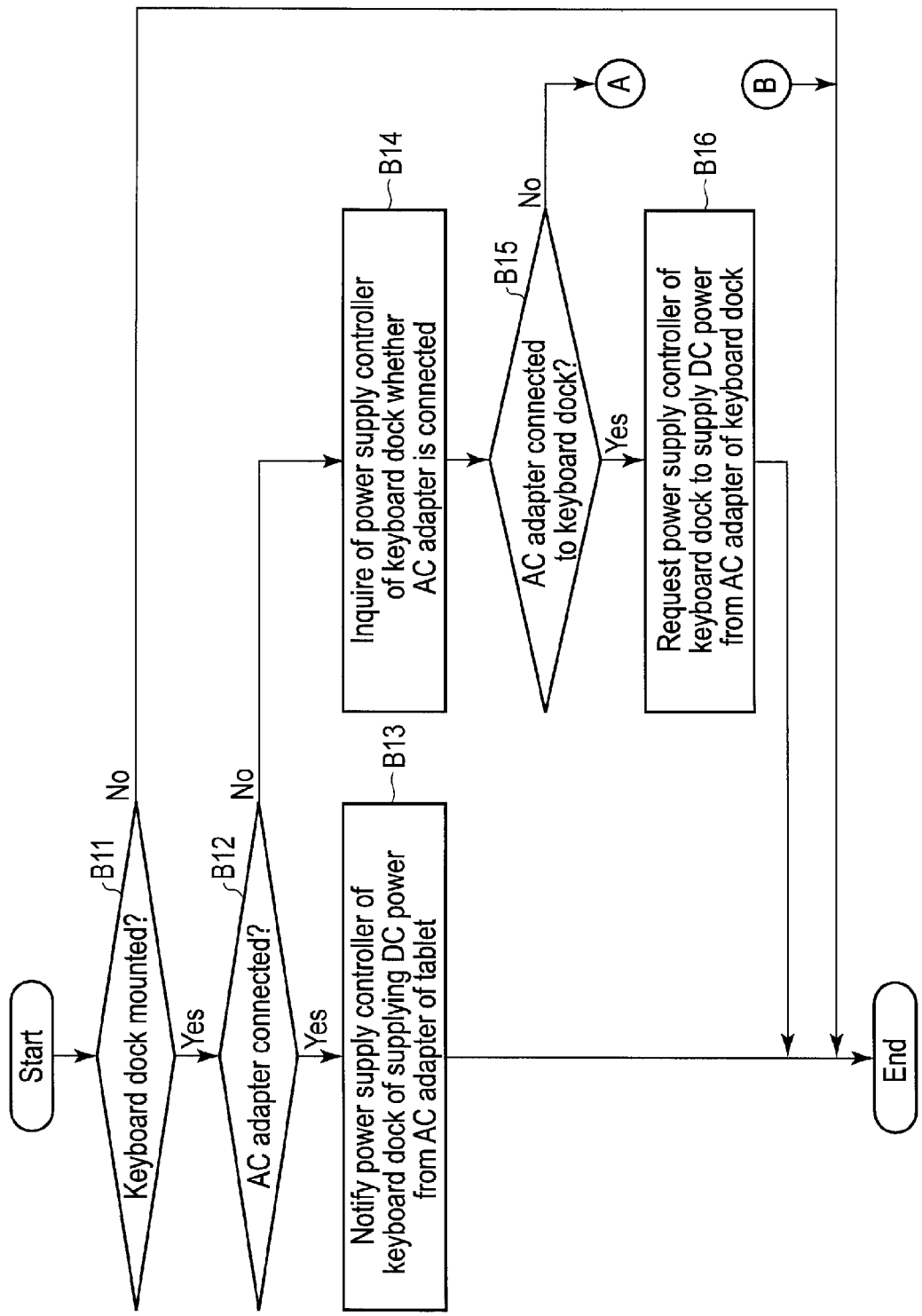
FIG. 4 is an exemplary flowchart showing a procedure under which a power supply controller 401 on a tablet 11 side determines a supply source of DC power.
Figure 5:
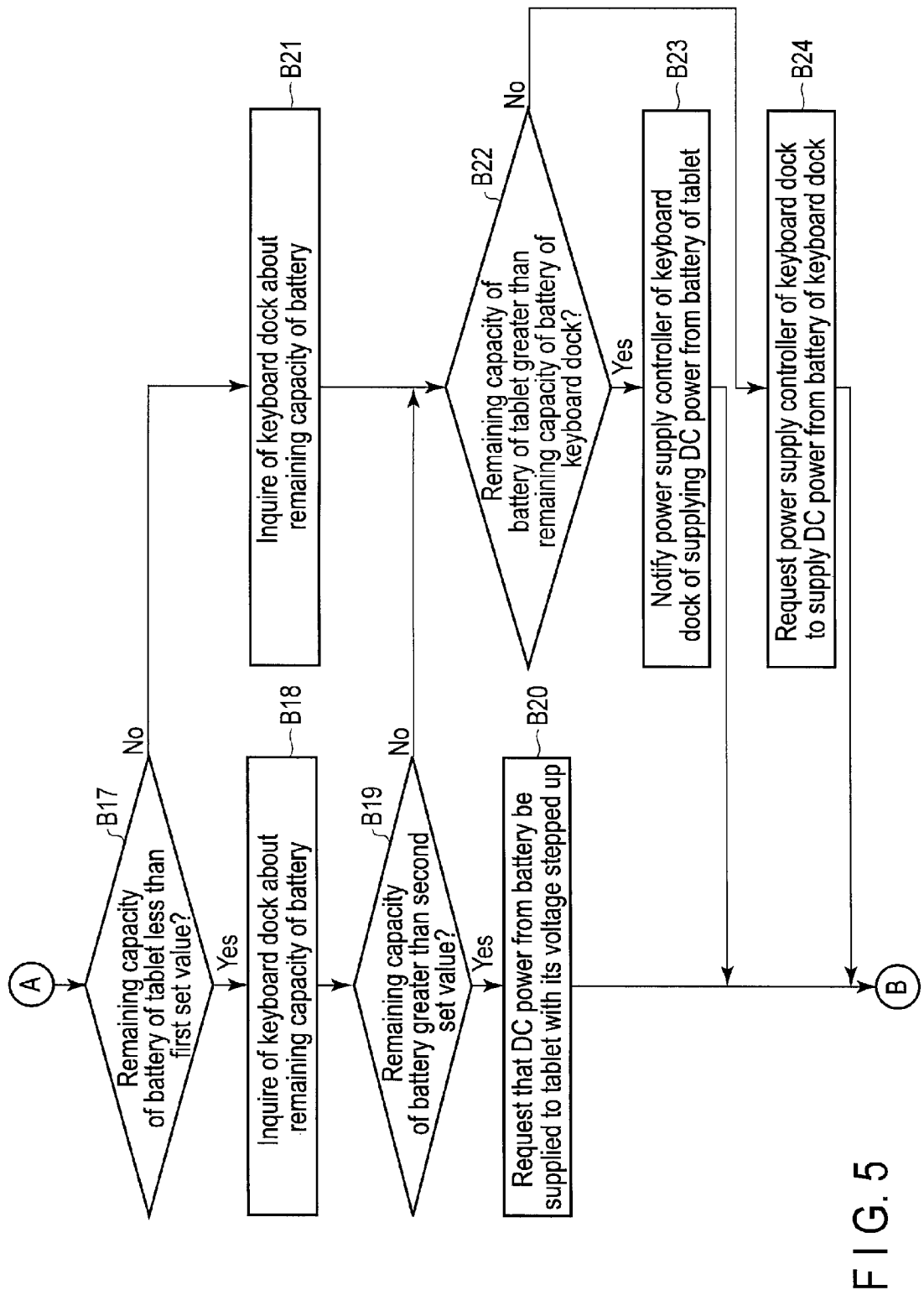
FIG. 5 is an exemplary flowchart showing the procedure under which the power supply controller 401 on the tablet 11 side determines a supply source of DC power.

FIG. 4 and FIG. 5 are flowcharts showing a procedure under which the power supply controller 401 on the tablet 11 side determines a supply source of DC power. The procedure for determining a supply source of DC power will be described with reference to FIG. 4 and FIG. 5.

The power supply controller 401 on the tablet 11 side determines whether the keyboard dock 12 is mounted (step B11). If it is determined that the keyboard dock 12 is mounted (Yes in step B11), the power supply controller 401 on the tablet 11 side determines whether the AC adapter 150 is connected to the tablet 11 (step B12). If it is determined that the AC adapter 150 is connected (Yes in step 312), the power supply controller 401 on the tablet 11 side notifies the power supply controller 401 on the keyboard dock 12 side of supplying DC power from the AC adapter 150 on the tablet 11 side (step B13).

If it is determined that the AC adapter 150 is not connected (No in step B12), the power supply controller 401 on the tablet 11 side inquires of the power supply controller 401 on the keyboard dock 12 side whether the AC adapter 250 is connected to the keyboard dock 12 (step B14). If a notification in response to the inquiry is given from the power supply controller 401 on the keyboard dock 12 side, the power supply controller 401 on the tablet 11 side determines whether the AC adapter 250 is connected on the basis of the content of the notification (step B15).

If it is determined that the AC adapter 250 is connected (Yes in step B15), the power supply controller 401 on the tablet 11 side requests that DC power be supplied from the AC adapter 250 to the tablet 11 (step B16). If it is determined that the AC adapter 250 is not connected (No in step B15), the power supply controller 401 on the tablet 11 side determines whether a remaining capacity of the battery 140 is less than a first set value (step B17). If it is determined that the remaining capacity of the battery 140 is less than the first set value (Yes in step B17), the power supply controller 401 on the tablet 11 side inquires of the keyboard dock 12 about a remaining capacity of the battery 340 (step B18).

If a notification in response to the inquiry is given by the power supply controller 401 on the keyboard dock 12 side, the power supply controller 401 on the tablet 11 side determines whether the remaining capacity of the battery 340 is greater than a second set value on the basis of the content of the notification (step B19). If it is determined that the remaining capacity of the battery 340 is greater than the second set value (Yes in step B19), the power supply controller 401 on the tablet 11 side requests that DC power from the battery 340 be supplied to the tablet 11 with its voltage stepped up (step B20).

If it is determined that the remaining capacity of the battery 140 is not less than the first set value (No in step B17), the power supply controller 401 on the tablet 11 side inquires of the keyboard dock 12 about the remaining capacity of the battery 340 (step B21).

After step B21 is carried out, or if it is determined that the remaining capacity of the battery 340 is not greater than the second set value (No in step B19), the power supply controller 401 on the tablet 11 side determines whether the remaining capacity of the battery 140 on the tablet 11 side is greater than the remaining capacity of the battery 340 on the keyboard dock 12 side (step B22). If it is determined that the remaining capacity of the battery 140 on the tablet 11 side is greater than the remaining capacity of the battery 340 on the keyboard dock 12 side (Yes in step B22), the power supply controller 401 on the tablet 11 side determines supplying DC power from the battery 140 on the tablet 11 side to the tablet 11 and the keyboard dock 12. The power supply controller 401 on the tablet 11 side notifies the power supply controller 401 on the keyboard dock 12 side of supplying DC power from the battery 140 on the tablet 11 side to the tablet 11 and the keyboard dock 12 (step B23).

If it is determined that the remaining capacity of the battery 140 on the tablet 11 side is not greater than the remaining capacity of the battery 340 on the keyboard dock 12 side (No in step B22), the power supply controller 401 on the tablet 11 side determines supplying DC power from the battery 340 on the keyboard dock 12 side to the tablet 11 and the keyboard dock 12. The power supply controller 401 on the tablet 11 side requests the power supply controller 401 on the keyboard dock 12 side to supply DC power from the battery 340 on the keyboard dock 12 side to the tablet 11 and the keyboard dock 12 (step B24).

A power supply source is determined in the following order of priority:
1. AC adapter 150;
2. AC adapter 250; and
3. battery (340 or 140).

Which of the battery 340 and the battery 140 is used is determined by the EC/KBC 130 on the basis of various parameters such as the remaining capacities of the batteries, a user setting, the number of charges and the battery temperature.

Figure 6:
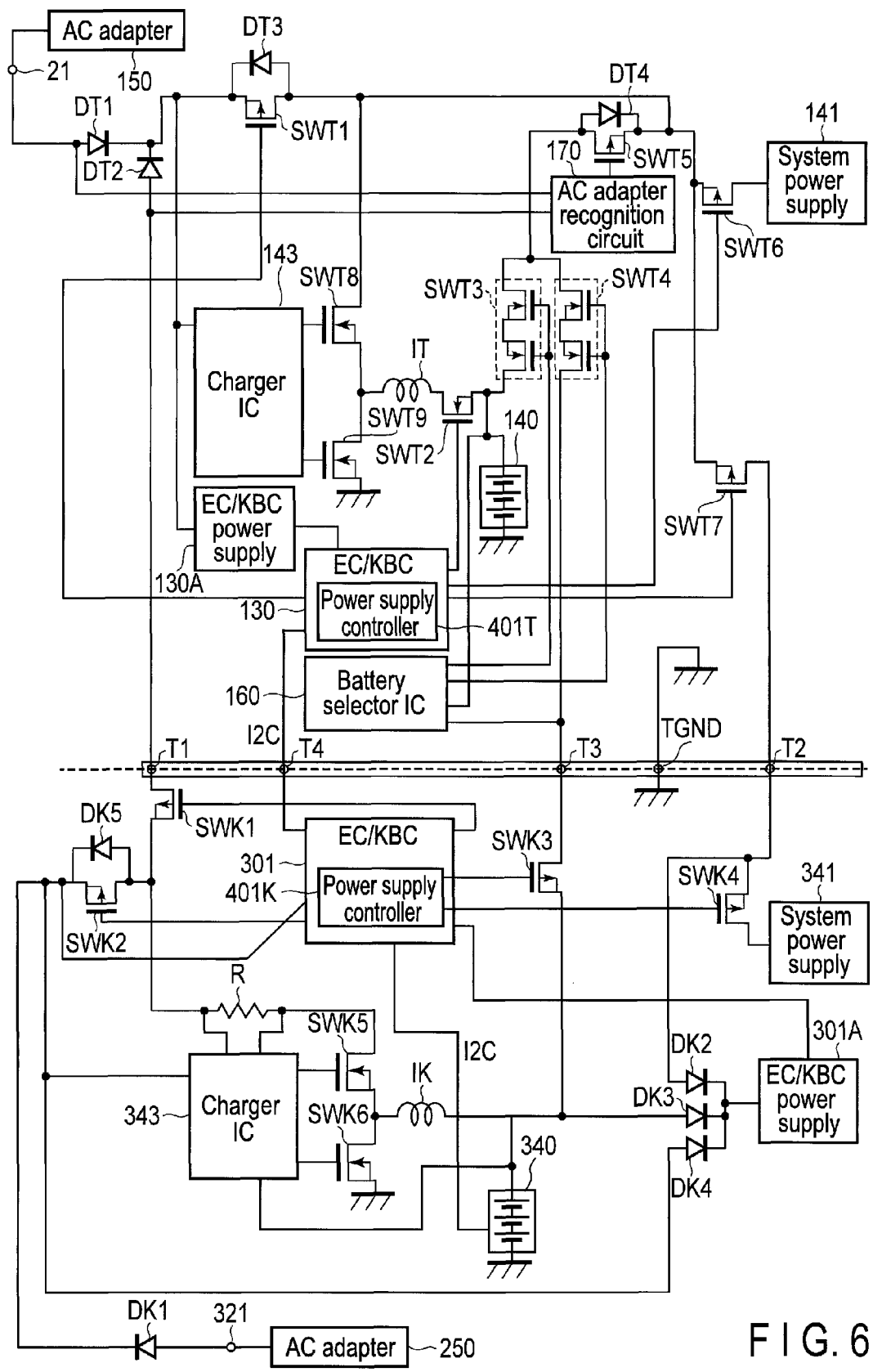
FIG. 6 is an exemplary block diagram showing a circuit for supplying power to the system.

FIG. 6 is a block diagram showing a circuit for supplying power to the system. The circuit which supplies power to the system will be described with reference to FIG. 6.

In the following description, the power supply controller 401 provided in the EC/KBC 130 on the tablet 11 side may be referred to as a power supply controller 401T. In addition, in the following description, the power supply controller 401 provided in the EC/KBC 301 on the keyboard dock 12 side may be referred to as a power supply controller 401K.

In order that the power supply controller 401T on the tablet 11 side controls a SWT1, the gate of the switch SWT1 and the EC/KBC 130 are electrically connected. In order that the power supply controller 401T on the tablet 11 side controls a switch SWT2, the gate of the switch SWT2 and the EC/KBC 130 are electrically connected. In order that a battery selector IC 160 controls a switch SWT3, the gate of the switch SWT3 and the battery selector IC 160 are electrically connected. In order that the battery selector IC 160 controls a switch SWT4, the gate of the switch SWT4 and the battery selector IC 160 are electrically connected. In order that an AC adapter recognition circuit 170 controls a switch SWT5, the gate of the switch SWT5 and the AC adapter recognition circuit 170 are electrically connected. In order that the power supply controller 401T on the tablet 11 side controls a switch SWT6, the gate of the switch SWT6 and the EC/KBC 130 are electrically connected. In order that the power supply controller 401T on the tablet 11 side controls a switch SWT7, the gate of the switch SWT7 and the EC/KBC 130 are electrically connected. In order that the charger IC 143 controls a switch SWT8, the gate of the switch SWT8 and the charger IC 143 are electrically connected. In order that the charger IC 143 controls a switch SWT9, the gate of the switch SWT9 and the charger IC 143 are electrically connected.

The power supply port 21 on the tablet 11 side is electrically connected to the anode of a diode DT1. The cathode of the diode DT1 is electrically connected to the source of the switch (p-channel metal-oxide-semiconductor field-effect transistor: pMOSFET) SWT1. The anode of a diode DT3 which is a parasitic diode of the switch SWT1 (pMOSFET) is electrically connected to the drain of the switch SWT1. The cathode of the diode DT3 is electrically connected to the source of the switch SWT1. The drain of the switch SWT1 is electrically connected to the source of the switch (pMOSFET) SWT6. The drain of the switch SWT6 is electrically connected to the system power supply 141.

The AC adapter recognition circuit 170 is electrically connected to the power supply port 21 on the tablet 11 side. A terminal T1 is electrically connected to the anode of the diode DT3 and the AC adapter recognition circuit 170. The cathode of the diode DT1 is electrically connected to the cathode of a diode DT2 and the source of the switch SWT1.

An EC/KBC power supply 130A is electrically connected to the cathode of the diode DT1, the cathode of the diode DT2, and the source of the switch SWT1. The EC/KBC power supply 130A is electrically connected to the EC/KBC 130. The charger IC 143 is electrically connected to the cathode of the diode DT1 and the cathode of the diode DT2.

The drain of the switch (n-channel metal-oxide-semiconductor field-effect transistor: nMOSFET) SWT8 is electrically connected to the drain of the switch SWT1. The drain of the switch (nMOSFET) SWT9 is electrically connected to the source of the switch SWT8. The source of the switch SWT9 is electrically connected to the earth.

One end of an inductor IT is electrically connected to the source of the switch SWT8 and the drain of the switch SWT9. The other end of the inductor IT is electrically connected to the battery 140 and the drain of the switch (nMOSFET) SWT2.

One end of the switch SWT3 is electrically connected to the battery 140 and the source of the switch SWT2. The other end of the switch SWT3 is electrically connected to one end of the switch SWT4 and the drain of the switch (pMOSFET) SWT5. The other end of the switch SWT4 is electrically connected to a terminal T3.

The source of the switch SWT5 is electrically connected to the drain of the switch SWT1, the anode of the diode DT3, the source of the switch (pMOSFET) SWT6, and the source of the switch (pMOSFET) SWT7. The drain of the switch SWT6 is electrically connected to the system power supply 141. The drain of the switch SWT7 is electrically connected to a terminal T2.

In order that the power supply controller 401K on the keyboard dock 12 side controls the switch SWK1, the gate of the switch SWK1 and the EC/KBC 301 are electrically connected. In order that the power supply controller 401K on the keyboard dock 12 side controls the switch SWK2, the gate of the switch SWK2 and the EC/KBC 301 are electrically connected. In order that the power supply controller 401K on the keyboard dock 12 side controls the switch SWK3, the gate of the switch SWK3 and the EC/KBC 301 are electrically connected. In order that the power supply controller 401K on the keyboard dock 12 side controls the switch SWK4, the gate of the switch SWK4 and the EC/KBC 301 are electrically connected. In order that the charger IC 343 controls a switch SWK5, the gate of the switch SWK5 and the charger IC 343 are electrically connected. In order that the charger IC 343 controls a switch SWK6, the gate of the switch SWK6 and the charger IC 343 are electrically connected.

The power supply port 321 on the keyboard dock 12 side is electrically connected to the anode of a diode DK1. The cathode of the diode DK1 is electrically connected to the source of the switch (pMOSFET) SWK2, the charger IC 343, and the anode of a diode DK4. The cathode of a diode DK5 which is a parasitic diode of the switch SWK2 is electrically connected to the source of the switch SWK2.

The drain of the switch (pMOSFET) SWK1 is electrically connected to the terminal T1. The source of the switch SWK1 is electrically connected to the drain of the switch (nMOSFET) SWK5 through a resistor R for current detection. The source of the switch SWK1 is electrically connected to the drain of the switch SWK2 and the anode of the diode DK5.

The drain of the switch SWK2 is electrically connected to the drain of the switch SWK5 through the resistor R.

The source of the switch SWK5 is electrically connected to the drain of the switch (nMOSFET) SWK6. The source of the switch SWK6 is connected to the earth. One end of an inductor IK is electrically connected to the source of the switch SWK5 and the drain of the switch SWK6. The other end of the inductor IK is electrically connected to the anode of a diode DK3 and the battery 340. The cathode of the diode DK3 is electrically connected to an EC/KBC power supply 301A.

The source of the switch (pMOSFET) SWK3 is electrically connected to the battery 340 and the anode of the diode DK3. The drain of the switch SWK3 is electrically connected to the terminal T3.

The source of the switch (pMOSFET) SWK4 is electrically connected to the terminal T2. The drain of the switch SWK4 is electrically connected to the system power supply 341. The anode of a diode DK2 is electrically connected to the terminal T2. The cathode of the diode DK2 is electrically connected to the EC/KBC power supply 301A. The cathode of the diode DK4 is electrically connected to the EC/KBC power supply 301A.

The charging circuit 142 is comprised of the switch SWT8, the switch SWT9, and the inductor IT. The charging circuit 342 is comprised of the switch SWK5, the switch SWK6, and the inductor IK.

Next, the states of circuit elements for supplying power to the system in various modes will be described.

1) Supplying Power from the AC Adapter 150 of the Tablet 11 (Docking State)

Figure 7:
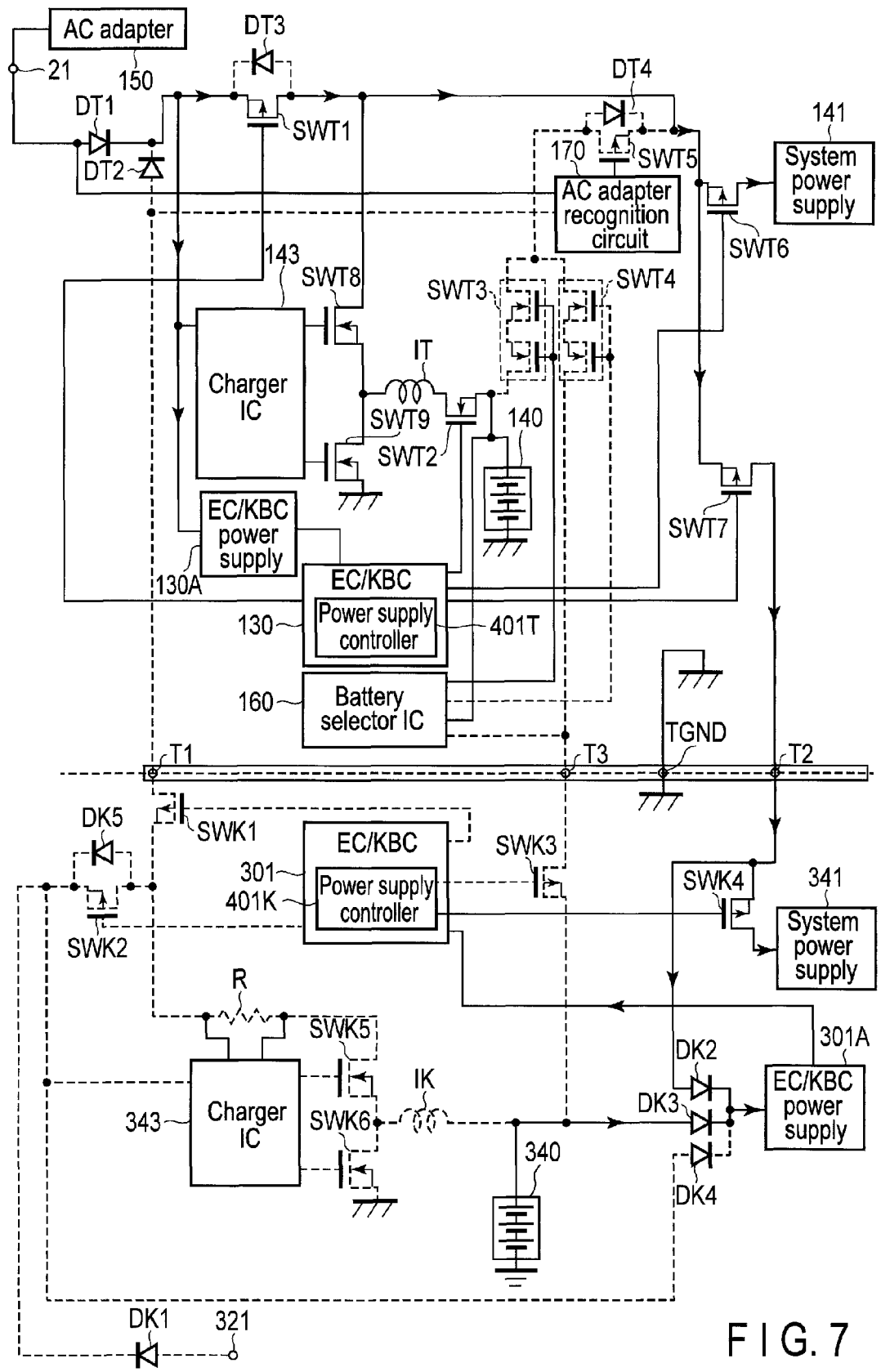
FIG. 7 is an illustration showing the case where the system operates on power from an AC adapter connected to a power supply port of the tablet.

The case where the system operates on power from the AC adapter 150 connected to the power supply port 21 of the tablet 11 will be described with reference to FIG. 7. In the following figures, a path through which power or a signal is not passed is indicated by a broken line.

If the AC adapter 150 is connected to the power supply port 21 of the tablet 11, the AC adapter recognition circuit 170 makes the switch SWT5 nonconductive. The battery selector IC 160 makes, for example, the switch SWT3 conduct. Since the switch SWT5 is unconductive, DC power from the battery 140 is not supplied to the EC/KBC power supply 130A, the system power supply 141, etc.

DC power supplied from the AC adapter 150 is supplied to the EC/KBC power supply 130A through the diode DT1. The EC/KBC power supply 130A transforms supplied DC power, and supplies it to the EC/KBC 130.

The power supply controller 401T on the tablet 11 side notifies the power supply controller 401K on the keyboard dock 12 side of supplying DC power from the AC adapter 150 on the tablet 11 side on the basis of the above-described flowcharts.

The power supply controller 401T on the tablet 11 side sets the switch SWT1 and the switch SWT7 in a conducting state. DC power supplied from the AC adapter is supplied to the EC/KBC power supply 301A through the diode DT1, the switches SWT1 and SWT7, the terminal T2, and the diode DK2. The EC/KBC power supply 301A transforms supplied DC power, and supplies it to the EC/KBC 301.

The power supply controller 401T on the tablet 11 side makes the switch SWT6 conduct when turning on the system power supply 341.

DC power supplied from the AC adapter 150 is supplied to the system power supply 141 through the diode DT1 and the switches SWT1 and SWT6. The system power supply 141 steps down the voltage of supplied DC power, and supplies DC power whose voltage has been stepped down to each module of the tablet 11.

The power supply controller 401K on the keyboard dock 12 side sets the switch SWK4 in a conducting state when turning on the system power supply 341. The power supply controller 401K on the keyboard dock 12 side keeps the switches SWK1, SWK2 and SWK3 in a non-conducting state. The charger IC 343 keeps the switches SWK5 and SWK6 in a non-conducting state.

DC power supplied from the AC adapter 150 is supplied to the system power supply 341 through the diode DT1, the switches SWT1 and SWT7, the terminal T2, and the switch SWK4. The system power supply 341 steps down the voltage of supplied DC power, and supplies DC power whose voltage has been stepped down to each module of the keyboard dock 12.

When charging the battery 140 on the tablet 11 side, the power supply controller 401T on the tablet 11 side sets the switch SWT2 in a conducting state. Then, the charger IC 143 charges the battery 140 with DC power supplied from the AC adapter 150.

2) Supplying Power from the AC Adapter 250 of the Keyboard Dock 12 (Docking State)

If the AC adapter 150 is not connected to the power supply port 21 of the tablet 11, the battery selector IC 160 sets the switch SWT3 in a conducting state, and the AC adapter recognition circuit 170 sets the switch SWT5 in a conducting state. DC power supplied from the battery 140 is supplied to the EC/KBC power supply 130A through the switch SWT3, the switch SWT5, and the diode DT3. The EC/KBC power supply 130A supplies DC power according to supplied DC power to the EC/KBC 130.

DC power supplied from the AC adapter 250 is supplied to the EC/KBC power supply 301A through the diode DK4. The EC/KBC power supply 301A transforms supplied DC power, and supplies the DC power to the EC/KBC 301.

The power supply controller 401T on the tablet 11 side requests the power supply controller 401K on the keyboard dock 12 side to supply DC power from the AC adapter 250 on the keyboard dock 12 side on the basis of the above-described flowcharts.

Figure 8:
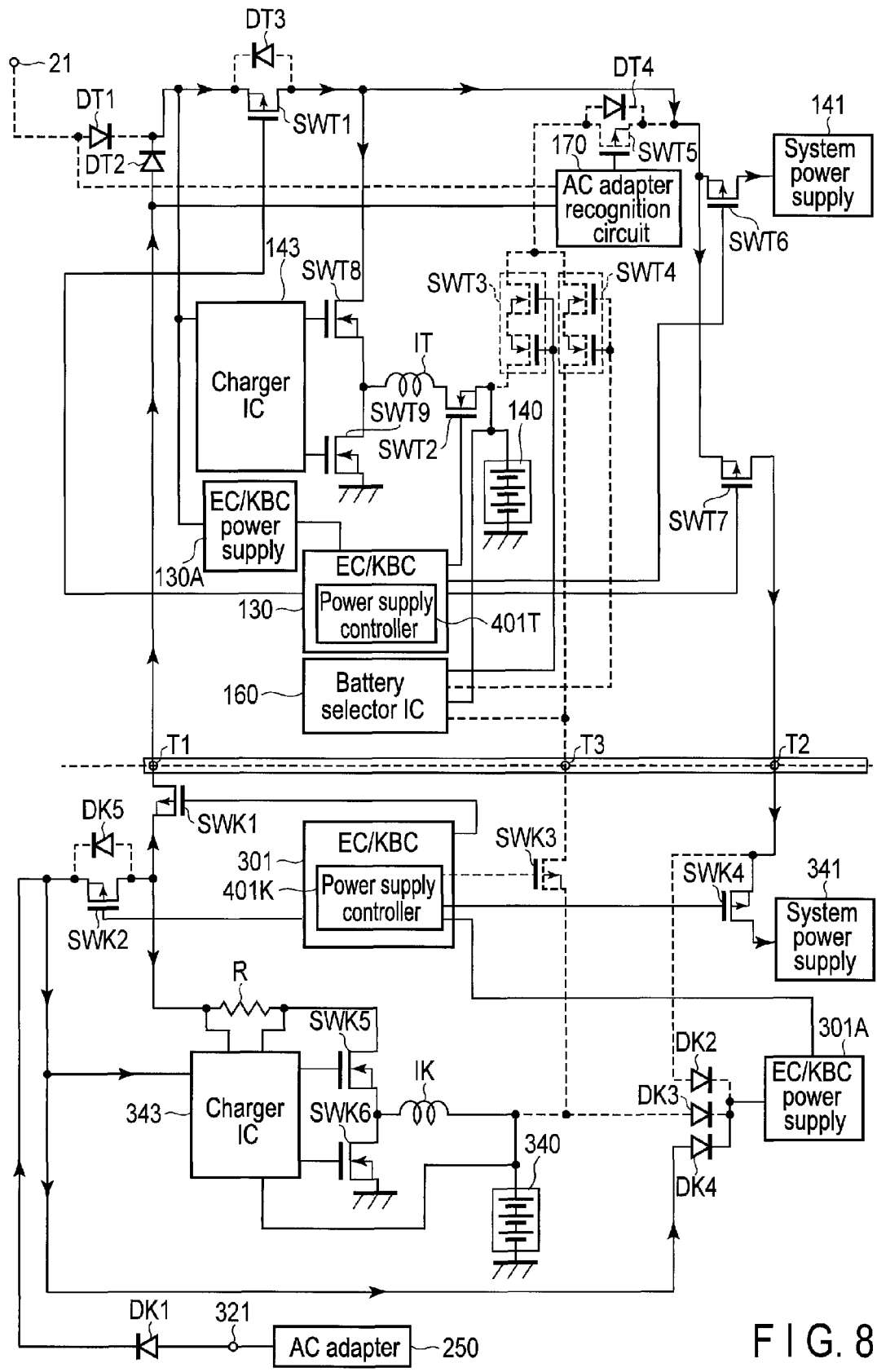
FIG. 8 is an illustration showing the case where the system operates on power from an AC adapter connected to a power supply port of a keyboard dock.

The case of operating on power from the AC adapter 250 connected to the power supply port 321 of the keyboard dock 12 will be described with reference to FIG. 8.

The power supply controller 401K on the keyboard dock 12 side makes the switches SWK1 and SWK2 conduct. DC power supplied from the AC adapter 250 is supplied to the EC/KBC power supply 130A through the switches SWK2 and SWK1 and the diode DT2. The EC/KBC power supply 130A transforms supplied DC power, and supplies the DC power to the EC/KBC 130. In addition, if DC power is supplied from the AC adapter 250, the AC adapter recognition circuit 170 sets the switch SWT5 in a non-conducting state.

The power supply controller 401K on the keyboard dock 12 side sets the switch SWK4 in a conducting state when turning on the system power supply 341. The power supply controller 401K on the keyboard dock 12 side sets the switch SWK3 in a non-conducting state.

The power supply controller 401T on the tablet 11 side sets the switches SWT1, SWT6 and SWT7 in a conducting state. The power supply controller 401T on the tablet 11 side sets the switches SWT3, SWT4 and SWT5 in a non-conducting state.

DC power supplied from the AC adapter 250 is supplied to the system power supply 341 through the switches SWK2 and SWK1, the terminal T1, the diode DT2, the switches SWT1 and SWT7, the terminal T2, and the switch SWK4. The system power supply 341 steps down the voltage of supplied DC power, and supplies DC power whose voltage has been stepped down to each module of the keyboard dock 12.

When charging the battery 340 on the keyboard dock 12 side, the power supply controller 401K on the keyboard dock 12 side steps down the voltage of DC power supplied from the AC adapter 250 by alternately setting the switch SWK5 and the switch SWK6 in a conducting state, and supplies DC power whose voltage has been stepped down to the battery 340.

DC power supplied from the AC adapter 250 is supplied to the system power supply 141 through the switches SWK2 and SWK1, the terminal T1, the diode DT2, and the switches SWT1 and SWT6. The system power supply 141 steps down the voltage of supplied DC power, and supplies DC power whose voltage has been stepped down to each module of the tablet 11.

When charging the battery 140 on the tablet 11 side, the power supply controller 401T on the tablet 11 side sets the switch SWT2 in a conducting state. When charging the battery 140 on the tablet 11 side, the charger IC 143 steps down the voltage of DC power supplied from the AC adapter 150 by alternately setting the switch SWT8 and the switch SWT9 in a conducting state, and supplies DC power whose voltage has been stepped down to the battery 140.

3) Supplying Power from the Battery 140 of the Tablet 11 (Docking State)

The battery selector IC 160 makes the switch SWT3 conduct. Since the AC adapters 150 and 250 are not connected, the AC adapter recognition circuit 170 sets the switch SWT5 in a conducting state. DC power supplied from the battery 140 is supplied to the EC/KBC power supply 130A through the switch SWT3, the switch SWT5, and the diode DT3. The EC/KBC power supply 130A steps down the voltage of supplied DC power, and supplies DC power whose voltage has been stepped down to the EC/KBC 130.

DC power supplied from the battery 340 is supplied to the EC/KBC power supply 301A through the diode DK3. The EC/KBC power supply 301A supplies DC power based on supplied DC power to the EC/KBC 301.

The power supply controller 401T on the tablet 11 side notifies the power supply controller 401K on the keyboard dock 12 side of supplying DC power from the battery 140 on the tablet 11 side to the keyboard dock 12.

Figure 9:
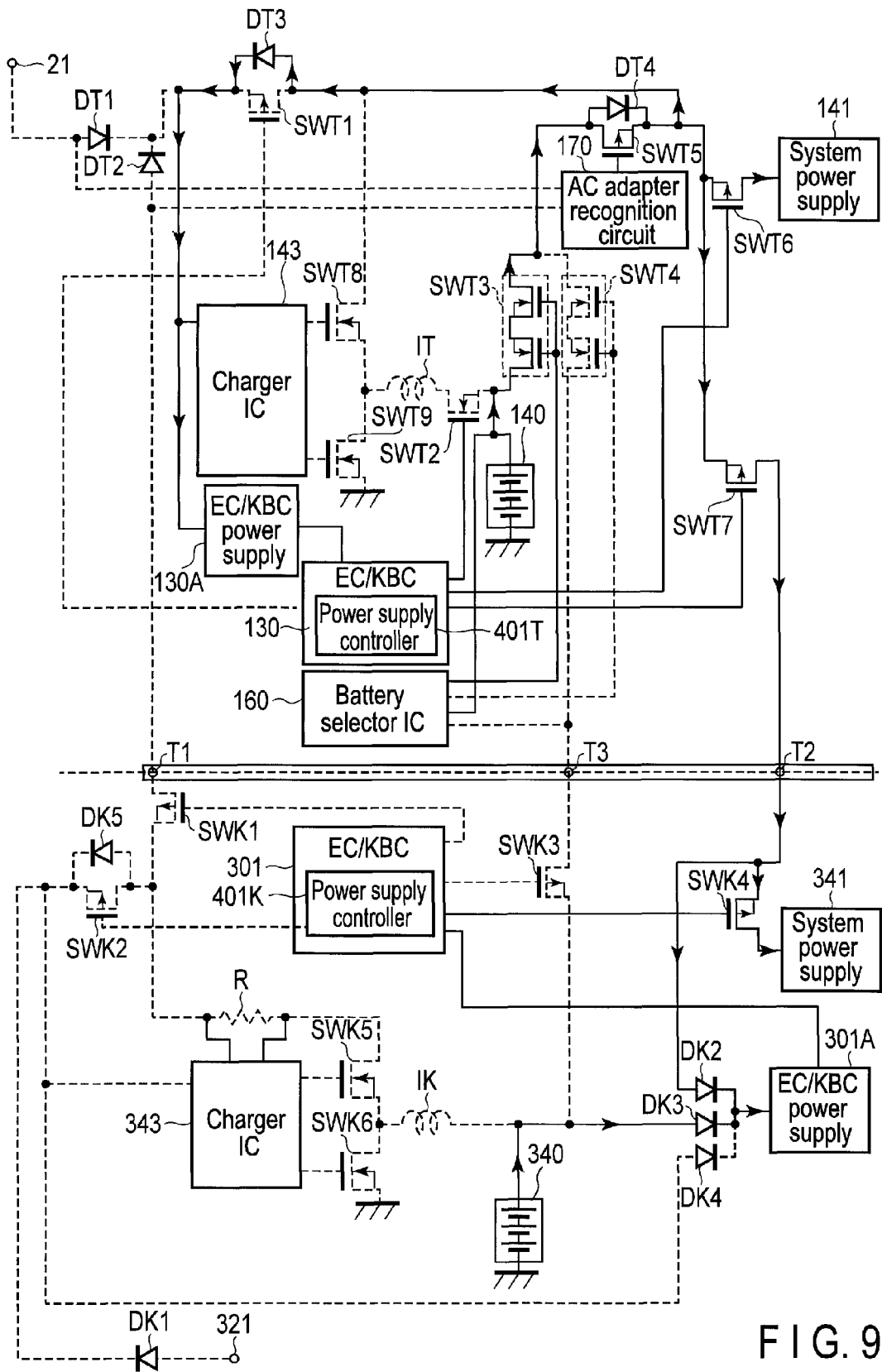
FIG. 9 is an illustration showing the case where the system operates on power from a battery of the tablet.

The case of operating on power from the battery 140 of the tablet 11 will be described with reference to FIG. 9.

The power supply controller 401T on the tablet 11 side sets the switch SWT7 in a conducting state.

DC power from the battery 140 is supplied to the EC/KBC power supply 301A through the switch SWT3, the switch SWT5, the switch SWT7, a terminal T2, and the diode DK2. The EC/KBC power supply 301A transforms supplied DC power, and supplies it to the EC/KBC 301.

The power supply controller 401T on the tablet 11 side makes the switch SWT1, the switch SWT6, and the switch SWT7 conduct. The power supply controller 401K on the keyboard dock 12 side makes the switch SWK4 conduct.

DC power supplied from the battery 140 is supplied to the system power supply 141 through the switch SWT3, the switch SWT5, and the switch SWT6. The system power supply 141 transforms supplied DC power, and supplies it to each module of the tablet 11.

DC power supplied from the battery 140 is supplied to the system power supply 341 through the switch SWT3, the switch SWT5, the switch SWT7, the terminal T2, and the switch SWK4. The system power supply 341 steps down the voltage of supplied DC power, and supplies DC power whose voltage has been stepped down to each module of the keyboard dock 12.

4) Supplying Power from the Battery 340 of the Keyboard Dock 12 (Docking State)

The battery selector IC 160 makes the switch SWT3 conduct. Since the AC adapters 150 and 250 are not connected, the AC adapter recognition circuit 170 sets the switch SWT5 in a conducting state. DC power supplied from the battery 140 is supplied to the EC/KBC power supply 130A through the switch SWT3, the switch SWT5, and the diode DT3. The EC/KBC power supply 130A transforms supplied DC power, and supplies it to the EC/KBC 130.

DC power supplied from the battery 340 is supplied to the EC/KBC power supply 301A through the diode DK3. The EC/KBC power supply 301A supplies DC power based on supplied DC power to the EC/KBC 301.

The power supply controller 401T on the tablet 11 side requests the power supply controller 401K on the keyboard dock 12 side to supply DC power from the battery 340 on the keyboard dock 12 side on the basis of the above-described flowcharts.

Figure 10:
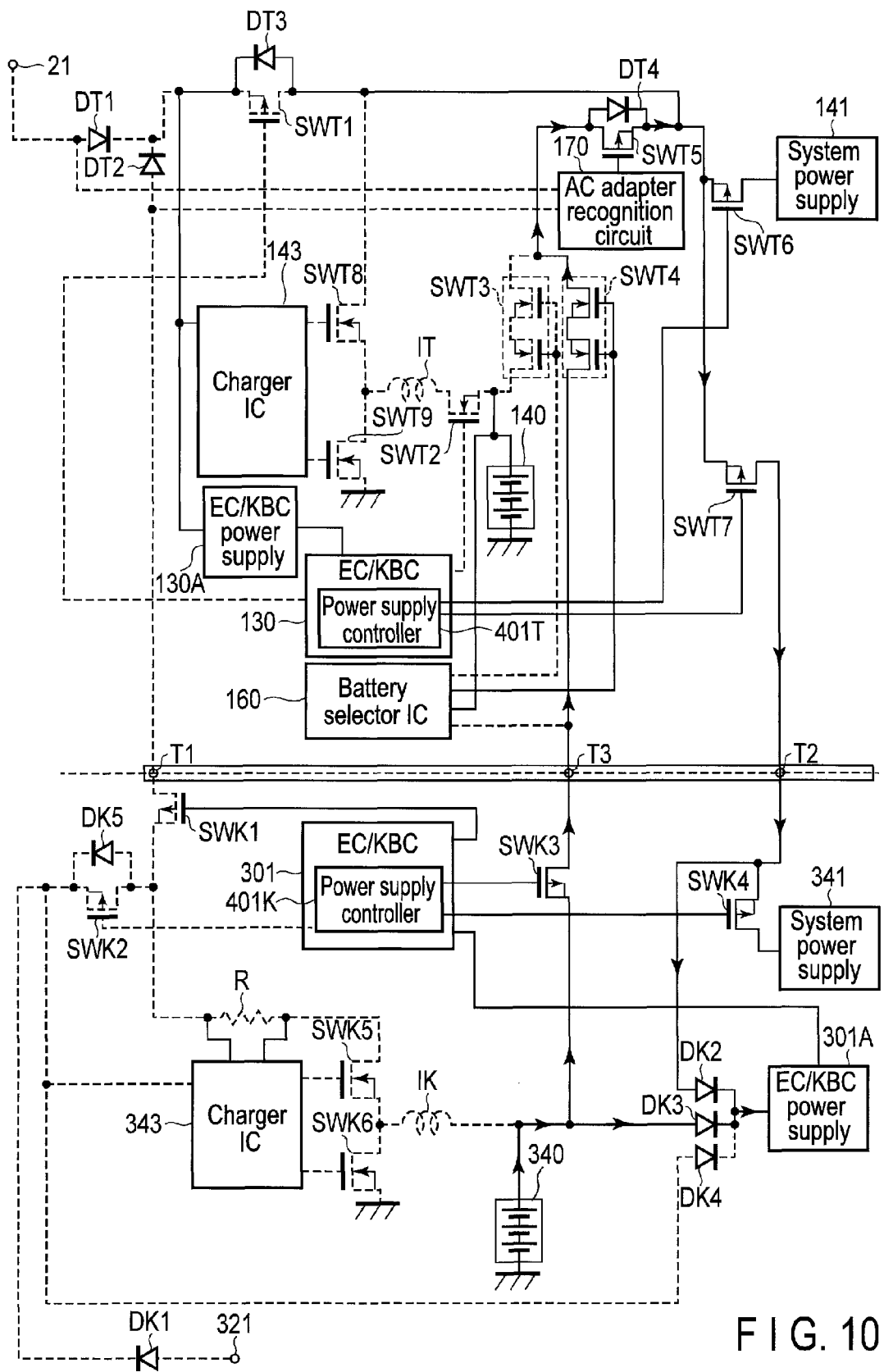
FIG. 10 is an illustration showing the case where the system operates on power from a battery of the keyboard dock.

The case of operating on power from the battery 340 of the keyboard dock 12 will be described with reference to FIG. 10.

DC power supplied from the battery 340 is supplied to the EC/KBC power supply 301A through the diode DK3. The EC/KBC power supply 301A transforms supplied DC power, and supplies it to the EC/KBC 301.

The EC/KBC 301 makes the switch SWK3 conduct. The battery selector IC 160 makes the switch SWT4 conduct. Since the AC adapters 150 and 250 are not connected, the AC adapter recognition circuit 170 makes the switch SWT5 conduct.

DC power supplied from the battery 340 is supplied to the EC/KBC power supply 130A through the switches SWK3 and SWK4, the switch SWT5, and the diode DT3. The EC/KBC power supply 130A transforms supplied DC power, and supplies it to the EC/KBC 130.

The power supply controller 401T on the tablet 11 side sets the switch SWT6 and the switch SWT7 in a conducting state.

DC power supplied from the battery 340 is supplied to the system power supply 141 through the switch SWK3, the terminal T3, the switch SWT4, the switch SWT5, and the switch SWT6. The system power supply 141 steps down the voltage of supplied DC power, and supplies DC power whose voltage has been stepped down to each module of the tablet 11.

DC power supplied from the battery 340 is supplied to the system power supply 341 through the switch SWK3, the terminal T3, the switch SWT4, the switch SWT5, the switch SWT6, the switch SWT7, the terminal T2, and the switch SWK4. The system power supply 341 steps down the voltage of supplied DC power, and supplies DC power whose voltage has been stepped down to each module of the keyboard dock 12.

5) Supplying Power from the Battery 340 of the Keyboard Dock 12, Stepping Up its Voltage (Docking State)

The battery selector IC 160 makes the switch SWT3 conduct. Since the AC adapters 150 and 250 are not connected, the AC adapter recognition circuit 170 sets the switch SWT5 in a conducting state. DC power supplied from the battery 140 is supplied to the EC/KBC power supply 130A through the switch SWT3, the switch SWT5, and the diode DT3. The EC/KBC power supply 130A transforms supplied DC power, and supplies it to the EC/KBC 130.

DC power supplied from the battery 340 is supplied to the EC/KBC power supply 301A through the diode DK3. The EC/KBC power supply 301A supplies DC power based on supplied DC power to the EC/KBC 301.

The power supply controller 401T on the tablet 11 side requests the power supply controller 401K on the keyboard dock 12 side to supply DC power obtained by stepping up the voltage of DC power supplied from the battery 340 on the keyboard dock 12 side.

The case of operating on DC power obtained by stepping up the voltage of DC power from the battery 340 of the keyboard dock 12 will be described with reference to FIG. 11.

The power supply controller 401K on the keyboard dock 12 side sets the switch SWK1 in a conducting state. The power supply controller 401K on the keyboard dock 12 side requests the charger IC 343 to step up the voltage of DC power from the battery 340. The charger IC 343 sets the switch SWK5 in a non-conducting state. The charger IC 343 steps up the voltage of DC power from the battery 340 by alternately switching the switch SWK6 between a conducting state and a non-conducting state.

DC power whose voltage has been stepped up is supplied to the AC adapter recognition circuit 170. The AC adapter recognition circuit 170 recognizes that DC power is being supplied from the AC adapter on the keyboard dock 12 side, and keeps the switch SWT5 in a non-conducting state.

DC power whose voltage has been stepped up is supplied to the EC/KBC power supply 130A and the charger IC 143 through the switch SWK1, the terminal T1, and the diode DT2. The EC/KBC power supply 130A transforms supplied DC power, and supplies it to the EC/KBC 130.

The power supply controller 401T on the tablet 11 side sets the switch SWT2, the switch SWT6, and the switch SWT7 in a conducting state. The power supply controller 401K on the keyboard dock 12 side sets the switch SWT4 in a conducting state.

The power supply controller 401T on the tablet 11 side requests the charger IC 143 to charge the battery 140. The charger IC 143 steps down the voltage of DC power whose voltage has been stepped up by alternately setting the switch SWT8 and the switch SWT9 in a conducting state, and supplies DC power whose voltage has been stepped down to the battery 140.

DC power whose voltage has been stepped up is supplied to the system power supply 141 through the switch SWK1, the terminal T1, the diode DT2, the switch SWT1, and the switch SWT6. The system power supply 141 steps down the voltage of supplied DC power, and supplies DC power whose voltage has been stepped down to each module of the tablet 11.

DC power whose voltage has been stepped up is supplied to the system power supply 341 through the switch SWK1, the terminal T1, the diode DT2, the switch SWT1, the switch SWT7, and the switch SWK4. The system power supply 341 steps down the voltage of supplied DC power, and supplies DC power whose voltage has been stepped down to each module of the keyboard dock 12.

6) The Tablet 11 Alone (the Keyboard Dock 12 is Detached): Supplying DC Power from the AC Adapter 150 (Undocking State)

The case where the tablet 11 operates on DC power from the AC adapter 150 will be described with reference to FIG. 12.

If the AC adapter 150 is connected to the power supply port 21 of the tablet 11, the AC adapter recognition circuit 170 makes the switch SWT5 nonconductive. The battery selector IC 160 makes, for example, the switch SWT3 conduct. Since the switch SWT5 is unconductive, DC power from the battery 140 is not supplied to the EC/KBC power supply 130A, the system power supply 141, etc.

DC power supplied from the AC adapter 150 is supplied to the EC/KBC power supply 130A and the charger IC 143 through the diode DT1. The EC/KBC power supply 130A transforms supplied DC power, and supplies it to the EC/KBC 130.

The power supply controller 401T on the tablet 11 side determines whether the keyboard dock 12 is mounted. In this case, the power supply controller 401T on the tablet 11 side determines that the keyboard dock 12 is not mounted. The power supply controller 401T on the tablet 11 side recognizes that the tablet 11 is operating alone. The power supply controller 401T on the tablet 11 side sets the switch SWT6 in a conducting state.

DC power supplied from the AC adapter 150 is supplied to the system power supply 141 through the switch SWT1, the diode DT1, and the switch SWT6. The system power supply 141 steps down the voltage of supplied DC power, and supplies DC power whose voltage has been stepped down to each module of the tablet 11.

When charging the battery 140 on the tablet 11 side, the power supply controller 401T on the tablet 11 side sets the switch SWT2 in a conducting state. The power supply controller 401T on the tablet 11 side requests the charger IC 143 to charge the battery 140. The charger IC 143 steps down the voltage of DC power supplied from the AC adapter 150 by alternately setting the switch SWT8 and the switch SWT9 in a conducting state, and supplies DC power whose voltage has been stepped down to the battery 140.

7) The Tablet 11 Alone (the Keyboard Dock 12 is Detached): Supplying DC Power from the Battery 140 (Undocking State)

Figure 13:
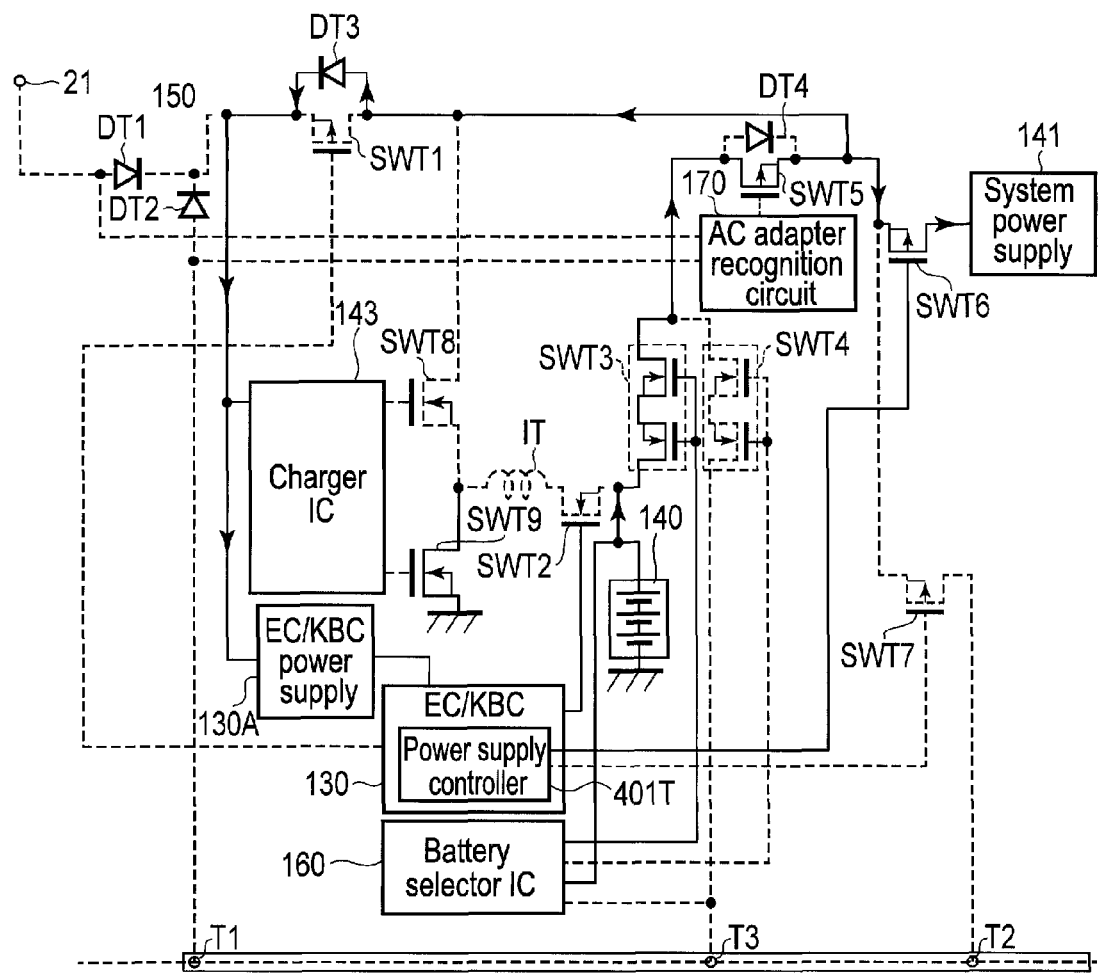
FIG. 13 is an illustration showing the case where the tablet operates on DC power from the battery in the state of not being mounted on the keyboard dock.

The case where the tablet 11 operates on DC power from the battery 140 will be described with reference to FIG. 13.

The battery selector IC 160 makes the switch SWT3 conduct. Since the AC adapters 150 and 250 are not connected, the AC adapter recognition circuit 170 makes the switch SWT5 conduct.

DC power supplied from the battery 140 is supplied to the EC/KBC power supply 130A through the switch SWT3, the switch SWT5, and the diode DT3. The EC/KBC power supply 130A transforms supplied DC power, and supplies it to the EC/KBC 130.

The power supply controller 401T on the tablet 11 side determines whether the keyboard dock 12 is mounted. In this case, the power supply controller 401T on the tablet 11 side determines that the keyboard dock 12 is not mounted. The power supply controller 401T on the tablet 11 side recognizes that the tablet 11 is operating alone. The power supply controller 401T on the tablet 11 side sets the switch SWT6 in a conducting state.

DC power supplied from the battery 140 is supplied to the system power supply 141 through the switch SWT3, the switch SWT5, and the switch SWT6. The system power supply 141 steps down the voltage of supplied DC power, and supplies DC power whose voltage has been stepped down to each module of the tablet 11.

8) The Keyboard Dock 12 Alone (the Tablet 11 is Detached): Supplying Power from the AC Adapter 250 (Separated State)

The case where the keyboard dock 12 operates alone on DC power from the AC adapter 250 will be described with reference to FIG. 14.

DC power supplied from the AC adapter 250 is supplied to the EC/KBC power supply 301A through the diode DK4. The EC/KBC power supply 301A transforms supplied DC power, and supplies it to the EC/KBC 301.

The power supply controller 401K on the keyboard dock 12 side determines whether the tablet 11 is mounted. The power supply controller 401K on the keyboard dock 12 side determines that the tablet 11 is not mounted. The power supply controller 401K on the keyboard dock 12 side determines that DC power is being supplied from the AC adapter 250 or the battery 340. The power supply controller 401K on the keyboard dock 12 side inquires of the charger IC 343 whether the AC adapter 250 is connected. The charger IC 343 notifies the power supply controller 401K on the keyboard dock 12 side that the AC adapter 250 is connected. The power supply controller 401K on the keyboard dock 12 side determines that the AC adapter 250 is connected.

When charging the battery 340 on the keyboard dock side, the power supply controller 401K on the keyboard dock 12 side requests the charger IC 343 to charge the battery 340. When charging the battery 340 on the keyboard dock 12 side, the charger IC 343 steps down the voltage of DC power supplied from the AC adapter 250 by repeatedly switching the switch SWK5 between a conducting state and a non-conducting state, and supplies DC power whose voltage has been stepped down to the battery 340.

When charging the battery 340, the LEDs 302 may be lit continuously or blinked to show that the battery 340 is being charged.

9) The Keyboard Dock Alone (the Tablet is Detached): Supplying Power from the Battery 340 (Separated State)

The case where the keyboard dock 12 operates alone on DC power from the battery 340 will be described with reference to FIG. 15.

DC power supplied from the battery 340 is supplied to the EC/KBC power supply 301A through the diode DK3. The EC/KBC power supply 301A transforms supplied DC power, and supplies it to the EC/KBC 301.

The power supply controller 401K on the keyboard dock 12 side determines whether the tablet 11 is mounted. The EC/KBC 301 of the keyboard dock 12 determines that the tablet 11 is not mounted. The EC/KBC 301 determines that DC power is being supplied from the AC adapter 250 or the battery 340. The EC/KBC 301 inquires of the charger IC 343 whether the AC adapter 250 is connected. Since the AC adapter 250 is not connected, the charger IC 343 cannot respond to the inquiry. If the EC/KBC 301 does not get any response from the charger IC 343 within a predetermined time period, the EC/KBC 301 determines that DC power is being supplied from the battery 340. The EC/KBC 301 keeps the switch in a non-conducting state.

According to the above-described embodiment, in the detachable 2-in-1 PC system 10, the power supply controllers 401 are provided on the tablet 11 side and the keyboard dock 12 side, respectively, whereby a plurality of switches included in a power supply path of the tablet 11 and the keyboard dock 12 can be easily controlled.

In the above-described embodiment, although the examples in which an extension device is a keyboard have been disclosed, the extension device may be a docking station.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising an electronic device and an extension device to which the electronic device is detachable from and attachable,
   wherein the electronic device comprises:
   a first battery;
   a first connector to which a first alternating current (AC) adapter is connected;
   a first control integrated circuit (IC) comprising a first power supply controller; and
   a first charger IC configured to charge the first battery with power selectively supplied from either the first AC adapter or the extension device in response to an instruction from the first power supply controller, and
   the extension device comprises:
   a second battery;
   a second connector to which a second AC adapter is connected;
   a second control IC comprising a second power supply controller; and
   a second charger IC configured to charge the second battery with power selectively supplied from either the second AC adapter or the electronic device in response to an instruction from the second power supply controller,
   wherein the extension device is configured such that when the extension device is mounted on the electronic device and the first AC adapter is connected to the first connector, the first power supply controller notifies the second power supply controller of supplying the extension device with power supplied from the first AC adapter,
   wherein the extension device is configured such that when the extension device is mounted on the electronic device and the first AC adapter is not connected to the first connecter, the first power supply controller inquires of the second power supply controller whether the second AC adapter is connected to the second connector, and requests, responsive to receiving a response which indicates that the second AC adapter is connected to the second connector, the second power supply controller to supply the electronic device with power supplied from the second AC adapter.

2. The system of claim 1, wherein
the first power supply controller is configured to determine whether a remaining capacity of the first battery is less than a first value responsive to receiving a response which indicates that the second AC adapter is not connected to the second connector, inquire of the second power supply controller about a remaining capacity of the second battery when the remaining capacity of the first battery is less than the first value, and request the second power supply controller to supply the electronic device with power supplied from the second AC adapter when the remaining capacity of the second battery obtained from the second power supply controller is greater than a second value.

3. The system of claim 2,
wherein the second power supply controller is configured to supply the electronic device with power from the second battery with its voltage stepped up or stepped down in response to a request from the first power supply controller.

4. The system of claim 2,
wherein the first power supply controller is configured to inquire of the second power supply controller about the remaining capacity of the second battery when the remaining capacity of the first battery is greater than the first value, and to notify the second power supply controller of supplying the extension device with power supplied from the first battery when the remaining capacity of the first battery is greater than the remaining capacity of the second battery obtained from the second power supply controller.

5. The system of claim 4,
wherein the first power supply controller is configured to request the second power supply controller to supply the electronic device with power supplied from the second battery when the remaining capacity of the first battery is less than the remaining capacity of the second battery obtained from the second power supply controller.

6. The system of claim 5, wherein the second power supply controller is configured to supply the electronic device with power of the second battery with its voltage stepped up or stepped down in response to a request from the first power supply controller.

\* \* \* \* \*